(12) United States Patent
Solheim

(10) Patent No.: US 7,043,159 B1
(45) Date of Patent: May 9, 2006

(54) BIDIRECTIONAL OPTICAL NETWORKS

(75) Inventor: Alan G. Solheim, Kanata (CA)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 10/216,397

(22) Filed: Aug. 12, 2002

Related U.S. Application Data

(63) Continuation of application No. 09/289,969, filed on Apr. 13, 1999, now abandoned.

(51) Int. Cl.
*H04B 10/20* (2006.01)
*H04J 14/00* (2006.01)
*H04J 14/02* (2006.01)

(52) U.S. Cl. .......................... 398/83; 398/59; 398/67; 398/85

(58) Field of Classification Search ............. 398/3, 398/4, 5, 59, 67, 72, 83, 85
See application file for complete search history.

(56) References Cited

U.S. PATENT DOCUMENTS

| | | | |
|---|---|---|---|
| 5,633,741 A | 5/1997 | Giles | 359/124 |
| 5,854,698 A * | 12/1998 | Eskildsen et al. | 398/59 |
| 5,886,801 A * | 3/1999 | Van Deventer | 398/59 |
| 5,943,149 A | 8/1999 | Cearns et al. | 359/124 |
| 6,069,719 A | 5/2000 | Mizrahi | 359/124 |
| 6,084,694 A | 7/2000 | Milton et al. | 359/124 |
| 6,222,653 B1 | 4/2001 | Asahi | 359/110 |
| 6,278,536 B1 | 8/2001 | Kai et al. | 359/127 |
| 6,282,005 B1 | 8/2001 | Thompson et al. | 359/173 |
| 6,295,149 B1 * | 9/2001 | Meli | 398/9 |
| 6,400,478 B1 * | 6/2002 | Cheng et al. | 398/79 |
| 6,631,018 B1 * | 10/2003 | Milton et al. | 398/59 |

OTHER PUBLICATIONS

Hitoshi Obara et al. (NTT Optical Network Systems Laboratories, 1-1, Hikari-no-oka, Yokosuka, Kanagawa, 238-03 Japan, Transmission over a 200-km single-fiber bidirectional ring network with reconfigurable WDM Add/Drop repeaters).*

* cited by examiner

Primary Examiner—M. R. Sedighian
(74) Attorney, Agent, or Firm—Hunton & Williams LLP

(57) ABSTRACT

A wavelength division multiplexed (WDM) apparatus is provided for a bidirectional dense WDM optical fiber communication network with cost-effective and efficient allocation of the resources available at each network node. For each fiber link, the invention uses a WDM signal composed of channels propagating in opposite directions and a band optical add-drop multiplexer (OADM) to isolate or combine a band to the WDM signal spectrum. As a result, the invention significantly reduces the number fiber connections and filtering equipment required with respect to each direction of transmission.

24 Claims, 5 Drawing Sheets

BIDIRECTIONAL OPTICAL NETWORKS

This application is a continuation application of U.S. patent application Ser. No. 09/289,969, filed on Apr. 13, 1999 now abandoned.

FIELD OF THE INVENTION

This invention relates generally to dense wavelength division multiplexed (WDM) optical fiber communication systems and more particularly to bidirectional optical networks.

BACKGROUND ART

In a WDM optical communication system, client signals are transmitted at different carrier wavelengths. The client signals are combined into a WDM signal using a multiplexer and transmitted along a single optic fiber. The WDM signal is typically composed of several channels of information with each channel corresponding to one of the client signals. When the WDM signal is received by the receiver terminal, the individual channels are separated by a demultiplexer and processed by optical receivers.

By partitioning and maintaining multiple wavelengths in a single fiber link, WDM technology can provide extended transport capacity and is an obvious fit for transmitting high volumes of traffic. This is particularly true for long distance communications schemes. As the demand for bandwidth is continuously rising, current WDM systems are now designed to provide even more bandwidth capacity.

Current WDM systems are not always designed solely with greater transport capacity. In some cases, the transport capacity provided by currently available WDM systems is adequate. When bandwidth is abundant, cost often becomes the prime consideration. In metropolitan environments, for example, the bandwidth requirements of local systems are typically lower than those of long distance WDM networks and therefore it is often desirable to reduce the initial cost of deploying a WDM network albeit at the expense of bandwidth.

In addition to greater bandwidth capacity, WDM systems are often designed with other attributes such as, for example, bidirectional operation and/or increased reliability to reduce link failures. However, these requirements does not permit a cost-effective and efficient allocation of the resources present in the network.

In conventional unidirectional WDM systems for example, the installation of at least two fiber links is required to achieve transmit and receive operations. Additional fibers are also necessary in both unidirectional and bidirectional WDM systems to "protect" the working fibers in the event of a link failure. Current protection configurations which require the installation of additional fiber links between nodes include dedicated protection (1 protection fiber for each fiber link also referred to as 1:1 protection), shared protection (1 protection fiber for N fiber links or 1:N protection) and ring protection. Therefore, in order to reduce the initial cost of a WDM optical network, it may be desirable to reduce the number of fiber connections used.

In addition to this ineffective use of fibers, the accommodation of multiple fiber links necessitates replicating some of the filtering equipment required at each node. In particular, the installation of a unidirectional or bidirectional WDM system such as those described above requires duplicating some of the filtering apparatus for each fiber used. The equipment unique to each fiber link and present at each node typically includes an add-drop multiplexer (ADM) which itself is comprised of a series of multi staged narrowband filters with high figures of merit (FOM). ADMs are typically used to achieve communication between nodes along a main fiber. Briefly described, an ADM is used in a WDM network to filter out and reroute at least one channel of the WDM signal (hereinafter the "drop channels") while the remaining channels (hereinafter the "through channels") travel through the ADM. The ADM can also be used to "add channels" to the WDM signal, using wavelengths that have been vacated as a result of channels being dropped at the ADM or at ADMs earlier in the transmission path. As more than one channel usually needs to be accessed at a network node, multichannel ADMs are used and are typically designed with cascaded filters such that each ADM filter is adding or dropping a channel to or from the WDM signal. The multichannel ADMs contribute significantly to the cost of a WDM optical network, particularly in the case of unidirectional local area networks where numerous multichannel ADMs are used. Duplicating this filtering equipment for each fiber link may prove to have a major impact on the initial cost of the WDM network.

In bidirectional networks, more complex multichannel ADMs are required which also has a substantial bearing on cost. In particular, for a given channel count, the multichannel ADMs used in bidirectional systems have twice the number of cascaded filters per fiber than the multichannel ADMs used in unidirectional networks. This higher number of filters results in higher optical loss on each fiber and necessitates optical amplifiers, thus also considerably increasing the system cost.

SUMMARY OF THE INVENTION

It is an object of the present invention to obviate or mitigate one or more of the above-identified disadvantages and shortcomings of current WDM systems.

This invention provides a bidirectional dense wavelength division multiplexed (WDM) optical fiber communication network with a cost-effective and efficient allocation of the resources available at each network node.

In a preferred embodiment, the invention uses for each fiber link a bidirectional WDM signal composed of channel signals propagating in opposite directions (transmit and receive). At each node, a band optical add-drop multiplexer (OADM) is used to select a first optical band from the WDM signal spectrum for isolating a designated number of optical channels capable of carrying a first set of interleaved transmit and receive channel signals while the remainder portion of the WDM signal spectrum is passed through. A multichannel coupling unit then separates the selected first optical band into the individual optical channels carrying the first set of interleaved transmit and receive channel signals. Each node is then able to communicate bidirectionally with other nodes of the WDM network over the first optical band of the WDM signal by receiving the receive channel signals in a receiver unit and generating the transmit channel signals in a transmitter unit.

According to the present invention, the band OADM also operates to combine a second optical band to the remainder portion of the WDM signal spectrum to form a new bidirectional WDM signal also for bidirectional communication with other nodes of the WDM network. To obtain this second optical band, the band OADM is connected to a second multichannel coupling unit where the optical channels carrying a second set of interleaved transmit and receive signals are combined to form the second optical band. The transmit channel signals of the second set of interleaved transmit and receive signals are also generated by the transmitter unit while the receive channel signals are received in the receiver unit for bidirectional communication with other nodes of the network via the new WDM signal.

By comparison with existing unidirectional configurations, the present invention advantageously reduces the number of filters and fibers required by half for the first 50% of the channels by interleaving channels within a band, therefore reducing the setup cost for low channel count systems. For high channel count systems, full fill capacity is maintained and at full fill, no additional cost is incurred.

Yet another advantage of the present invention over existing unidirectional configurations is that the number of ADM nodes per fiber is reduced therefore improving the optical link budgets and deferring the requirements for optical amplifiers.

By comparison with existing bidirectional topologies of comparable channel density, another advantage of the present invention is the resulting reduction in filtering requirements therefore further reducing the cost of the WDM system. In particular, by interleaving channels within a band, the effective channel spacing between adjacent channels of that band is reduced while the associated crosstalk is maintained to an acceptable level. As the effective channel spacing between adjacent channels is reduced, a corresponding reduction in the figure of merit (FOM) of the filters required is achieved which results in lower filtering costs. Alternatively, for a fixed FOM, the effective spacing between adjacent channels within a band can be reduced for providing a higher bandwidth capacity per band.

One particular embodiment of the present invention comprises a band OADM for a bidirectional WDM network for processing first and second bidirectional WDM signals each of a respective spectrum formed of multiple optical channels for carrying channel signals in a first direction and channel signals in a second direction. The band OADM is operative for isolating a first optical band from the first WDM signal spectrum, isolating a second optical band from the second WDM signal spectrum, and passing through a remainder portion of the first WDM signal spectrum to form a remainder portion of the second WDM signal spectrum, wherein each of the first and second optical bands contains a respective first set of optical channels comprising at least one optical channel for carrying a channel signal propagating in the first direction and at least one other optical channel for carrying a channel signal propagating in the second direction. Each of the first and second WDM signal spectrum may beneficially be formed of a respective first plurality of optical channels for carrying respective channel signals propagating in the first direction and a second plurality of optical channels for carrying respective channel signals propagating in the second direction, wherein the first plurality of optical channels is interleaved with the second plurality of optical channels.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1A:
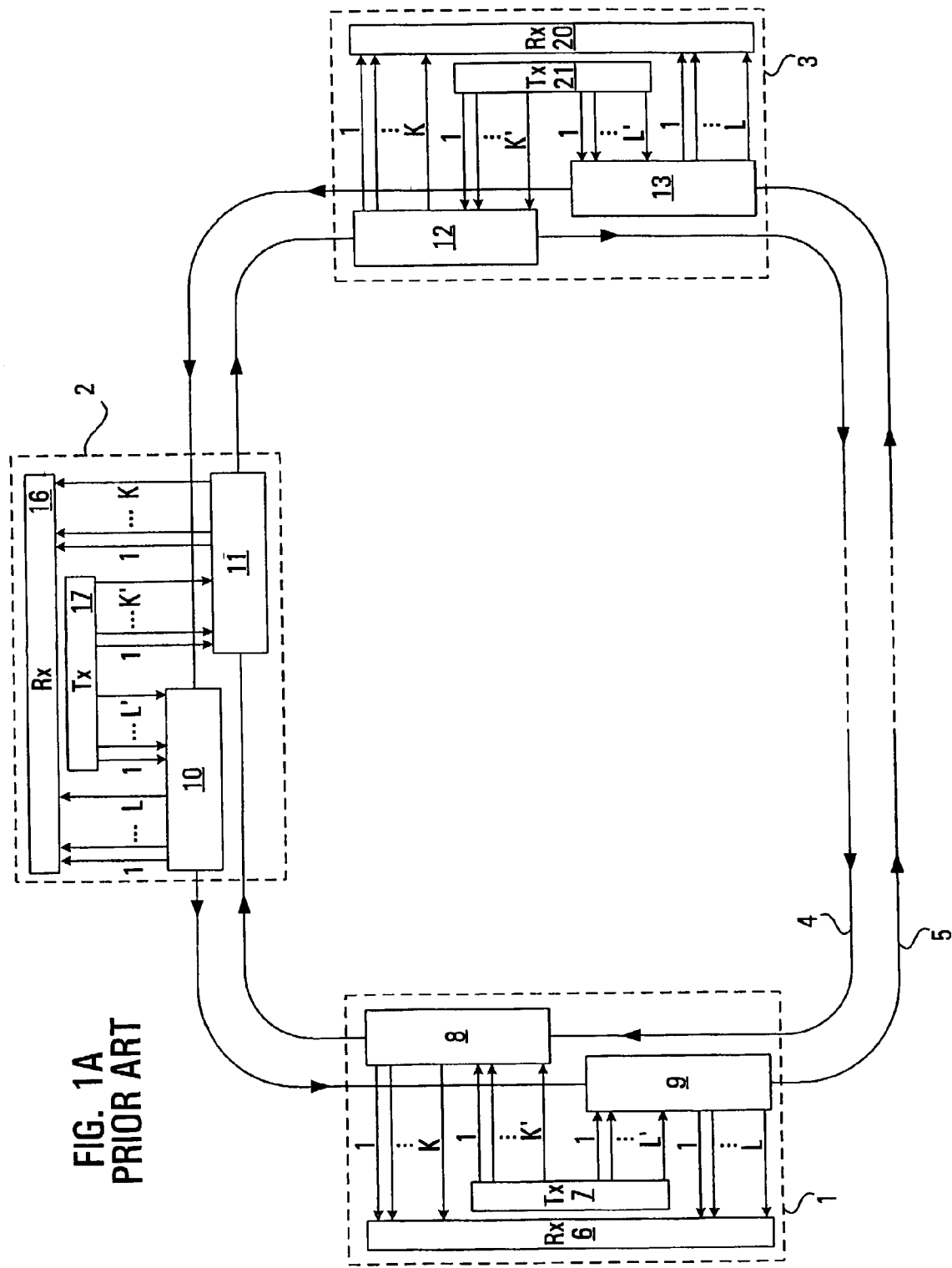
FIG. 1A is a block diagram of a conventional bidirectional wavelength division multiplexed (WDM) ring network.

Current dense wavelength division multiplexed (WDM) fiber optic communication networks which use multiple fiber links to provide additional functionality such as bidirectional communication or network connectivity protection are diverse in topology and configuration. The bidirectional dense WDM optical ring network (hereinafter the "bidirectional WDM ring network" or "the bidirectional WDM network") is an example of a WDM network with multiple fiber links. A conventional bidirectional WDM ring network is shown in FIG. 1A. This bidirectional WDM ring network uses a first fiber link 4 for providing clockwise communication between a plurality of nodes (only three shown) generally indicated by 1, 2, 3 and a second fiber link 5 for providing counter-clockwise communication between the same nodes 1, 2, 3.

Each node 1, 2, 3 incorporates a pair of add-drop multiplexers (ADMs) generally indicated by 8, 9, 10, 11, 12, 13, an optical transmitter unit 7, 17, 21 comprising a plurality of optical transmitters (not shown) and an optical receiver unit 6, 16, 20 comprising a plurality of optical receivers (not shown). The nodes 1, 2, 3 each communicate with the rest of the bidirectional WDM ring network via two WDM signals, each respectively propagating in one of the first and second fibers 4, 5.

The WDM signals used for communication in the bidirectional WDM ring network of FIG. 1A are each formed of N optical channels and these N optical channels each carry a respective channel signal propagating at particular wavelength. For clarity in describing the bidirectional WDM ring network of FIG. 1A, the WDM signals will hereinafter be only referred to as comprising N optical channels without any reference to the associated channel signals. It is understood that by referring to the optical channels, reference to the associated channel signals is implied.

For clockwise communication, a first WDM signal comprising N optical channels respectively propagating at a particular wavelength is used in the first fiber 4 to transmit data between the ADMs 8, 11, 12 which are interconnected along the first fiber 4 in a ring configuration. Briefly stated, each ADM 8, 11, 12 operates to extract (or drop) a desired set of channels K (only three shown) from the WDM signal propagating in the first fiber 4 and feed these K channels to the corresponding optical receiver unit 6, 16, 20 where each of the K channels is received by a respective one of the plurality of optical receivers contained therein. The channels N–K which are not extracted by a given node 1, 2, 3 are passed through that particular node 1, 2, 3 and combined (or added) with a new set of channels K' generated by the associated optical transmitter unit 7, 17, 21 to form a new WDM signal for transmission over the first fiber link 4.

For counter-clockwise communication, a second WDM signal of N optical channels is used along the second fiber 5 to transfer data between the ADMS 9, 10, 13 which are also interconnected in a ring configuration. Similarly to the ADMs 8, 11, 12 used for clockwise operations, each ADM 9, 10, 13 functions to extract (drop) a desired set of channels L from the second WDM signal, pass through the remaining N-L channels and add thereto a new set of channels L' each generated by a respective one of the optical transmitters contained in the associated optical transmitter unit 7, 17, 21 to form a new WDM signal propagating on the second fiber 5.

The nodes 1, 2, 3 of the bidirectional WDM ring network of FIG. 1A and more particularly the ADMs 8, 11, 12 used for clockwise communication and the ADMs 9, 10, 13 used for counter-clockwise communication all have an identical architecture and mode of operation and will be now described below with reference only to the ADM 8 used in the clockwise transmission path. For this description, reference is now made to FIG. 1B where the ADM 8 of FIG. 1A is shown in more detail.

Figure 1B:
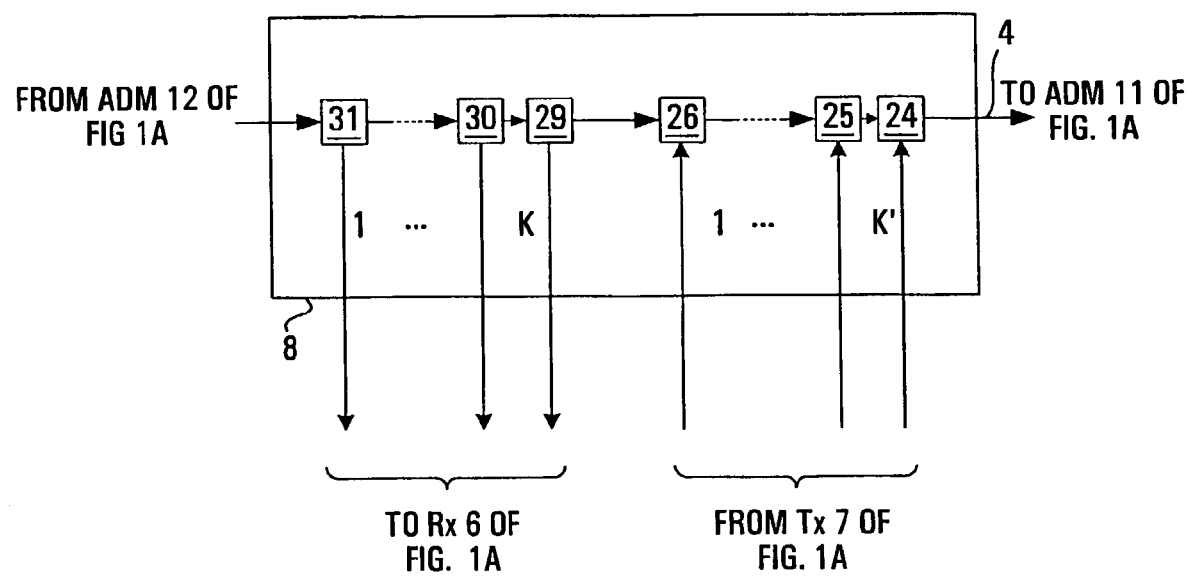
FIG. 1B is a block diagram of the multichannel add-drop multiplexer of the bidirectional WDM ring network of FIG. 1A.

The ADM 8 of FIG. 1B is comprised of a plurality of cascaded demultiplexers 29, 30, 31 (only three shown) connected at one end (demultiplexer 31) to receive the WDM signal and respectively coupled to the optical receiver 6 of FIG. 1A. These cascaded demultiplexers 29, 30, 31 are connected in series with a plurality of cascaded multiplexers 24, 25, 26 (only three shown) which are respectively connected to the optical transmitter unit 7 of FIG. 1A to produce the WDM signal (at multiplexer 24) for further transmission along the first fiber 4.

In operation, the ADM 8 receives the WDM signal composed of N channels which are propagating in the clockwise direction along the first fiber 4 and extracts from it a desired set of channels K while the remaining N–K channels are passed through. The extracted channels K are conveyed to the optical receiver unit 6 (see FIG. 1A) for further processing and rerouting. The ADM 8 also operates to combine a new set of channels K' generated by the optical transmitter unit 7 of FIG. 1 with the through channels N–K for further transmission in the clockwise direction and along the first fiber 4.

Typically, conventional multiplexers and demultiplexers such as those used in the ADM 8 of FIG. 1A are narrowband optical filters, each operating at a fixed wavelength such that only a particular channel occupying a narrowband centered around a particular wavelength can be extracted from or combined with the WDM optical spectrum. As noted above, these narrowband optical filters are connected in series and therefore cause optical losses on the channels N–K passed through. In order to reduce the through loss, a band optical (hereinafter the "band OADM") can also be used in combination with the narrowband optical filters. The band OADM is further described below in reference with FIGS. 2, 3A and 3B.

For the ADM 8 of the bidirectional WDM ring network of FIG. 1A, each demultiplexer 29, 30, 31 operates to extract one of the desired K channels from the WDM signal for rerouting and further processing by the corresponding optical receiver unit 6 (FIG. 1A) while the cascaded multiplexers 24, 25, 26 respectively function to couple one of the new channels K' generated by the optical transmitter unit 7 (FIG. 1A) into the first fiber 4. Usually, the new channels K' are added to the through channels N–K using wavelengths which have not yet been used or wavelengths that have been vacated as a result of the channels being dropped by one of the demultiplexers 29, 30, 31 or by other demultiplexers located earlier in the transmission path. By coupling these new channels K' into the first fiber 4, the new channels K' are therefore combined to the through channels N–K to form the new WDM signal for clockwise transmission to other nodes 2, 3.

Figure 2:
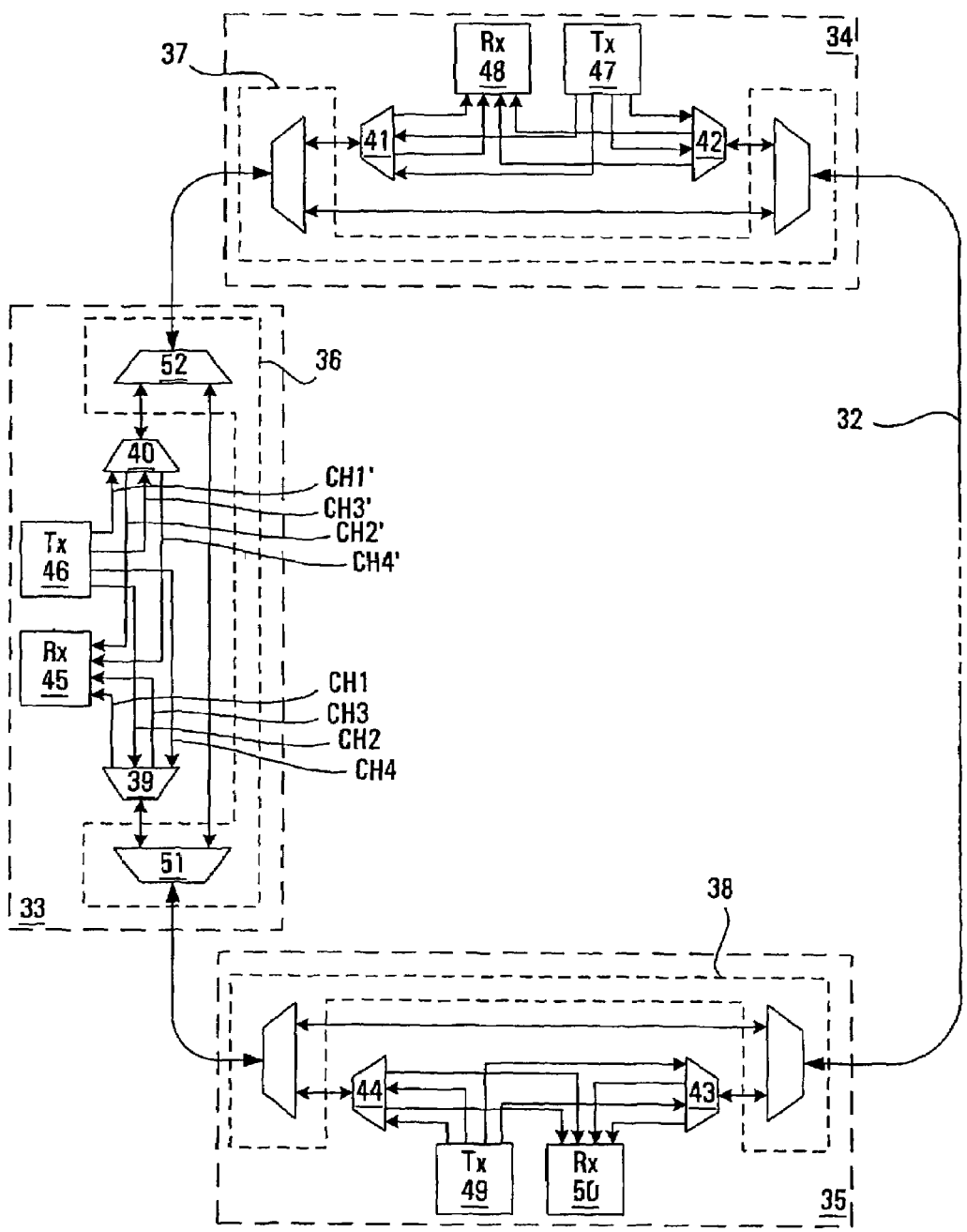
FIG. 2 is a block diagram of a bidirectional WDM ring network according to an embodiment of the present invention.

Referring now to FIG. 2, there is shown a bidirectional WDM ring network which uses a single fiber link 32 according to an embodiment of the present invention. The bidirectional WDM ring network is composed of a plurality of nodes generally indicated by 33, 34, 35 (only three shown) which are interconnected via the fiber link 32.

For achieving bidirectional communication between the nodes 33, 34, 35, a bidirectional WDM signal of a defined spectrum formed by N contiguous optical channels is used in the fiber link 32. Each of the N optical channels carries a respective channel signal propagating in a particular direction along the fiber link 32. For clarity, the bidirectional WDM signal used in the bidirectional WDM ring network of FIG. 2 will hereinafter be referred to as a WDM signal comprising N optical channels without any reference to the associated channel signals. However, it is understood that by referring to the optical channels, reference to the associated channel signals is implied.

The N optical channels of the WDM signal are wavelength interleaved such that the channel direction of transmission alternates with the ascending order of channel wavelength. As an example, the WDM signal propagating in the fiber 32 has the even numbered channels propagating in one direction, and the odd numbered channels propagating in the opposite direction.

The nodes 33, 34, 35 of the bidirectional WDM ring network embodiment illustrated in FIG. 2 implement two functions. First, each node 33, 34, 35 operates to isolate a first band comprising a set of K contiguous and interleaved channels from the WDM signal optical spectrum. At each node 33, 34, 35, K is chosen to be an even number such that the first band isolated from the WDM signal optical spectrum contains an even number of channels. As an example, for the WDM ring network of FIG. 2, K is set to 4 (K=4) such that each node 33, 34, 35 has a first band containing four interleaved channels. To further illustrate this, FIG. 2 also shows the four channels isolated at node 33 as being respectively labelled channel 1 (ch1), channel 2 (ch2), channel 3 (ch3) and channel 4 (ch4) and interleaved with ch1 and ch3 propagating in one direction and ch2 and ch4 propagating in the opposite direction. In this particular example, ch1 and ch3 are referred to as receive channels while ch2 and ch4 are referred to as transmit channels.

At each node 33, 34, 35, the respective first band isolated is then separated into its constituent transmit and receive optical channels ch1, ch2, ch3, ch4. Each node 33, 34, 35 is then able to communicate bidirectionally with other nodes 33, 34, 35 of the bidirectional WDM ring network over the first optical band of the WDM signal via the transmit and receive channel signals ch1, ch2, ch3, ch4.

The second function performed by the nodes 33, 34, 35 is to respectively combine the remainder portion of the WDM signal optical spectrum (hereinafter the "through band") containing the interleaved channels N–K with a second band containing a new set of K' interleaved channels to form a new bidirectional WDM signal also for bidirectional communication with other nodes 33, 34, 35 of the WDM network. Similarly to the selection of K, K' is also selected to be an even number such that the second band to be combined to the through band contains an even number of channels. For example, the embodiment shown in FIG. 2 has K'=4 and therefore the second band at each node 33, 34, 35 also has four interleaved channels. Again, to further clarify this, FIG. 2 shows as an example, the four channels forming the second band combined at node 33 to the through band as being respectively labelled ch1', ch2', ch3' and ch4'. Similarly to ch1, ch2, ch3 and ch4 of the first band, these four new channels ch1', ch2', ch3' and ch4' are interleaved such that ch1' and ch3' are propagating in one direction and ch2' and ch4' are propagating in the opposite direction. For this particular example, ch1' and ch3' are referred to as transmit channels while ch2' and ch4' are referred to as receive channels.

Node 33 of the bidirectional WDM ring network of FIG. 2 uses the same spectral range for the first band and the second band. Within that spectral range, the new set of interleaved channels ch1', ch2', ch3' and ch4' (K'=4) of the second band is combined to the WDM signal spectrum using the same wavelengths than those used by the channels ch1, ch2, ch3, and ch4 of the first band.

In order to perform the band isolation/combination function described above, each node 33, 34, 35 incorporates a band OADM generally indicated by 36, 37, 38. The band OADMs 36, 37, 38 are interconnected in a ring configuration along the fiber link 32.

At each node 33, 34, 35, the band OADM 36, 37, 38 is connected to a first and second multichannel coupling unit 39,40, 41,42, 43,44 also referred to as narrowband multiplexer (mux)/demultiplexer (demux) with each narrowband mux/demux 39,40, 41,42, 43,44 connected to an optical receiver unit 45, 48, 50 comprising a plurality of optical receivers (not shown) and an optical transmitter unit 46, 47, 49 comprising a plurality of optical transmitters (not shown).

The nodes 33, 34, 35 and more particularly the band OADMs 36, 37, 38 and narrowband mux/demux 39,40, 41,42, 43,44 arrangements used all have an identical architecture and mode of operation and will now be described below with reference to a single band OADM 36 and its associated narrowband mux/demux 39, 40.

The band OADM 36 of FIG. 2 consists of a wideband demultiplexer 51 for isolating the first band from the WDM signal spectrum and a wideband multiplexer 52 for combining the second band to the WDM signal spectrum to form the new bidirectional WDM signal. More specifically, the wideband demultiplexer 51 is externally coupled to node 35 to the WDM signal. The wideband demultiplexer 51 is also externally connected to the first narrowband mux/demux 39 which, in turn, is coupled to both the optical receiver unit 45 and the optical transmitter unit 46. The second narrowband mux/demux 40 is also coupled to both the optical transmitter unit 46 and the optical receiver unit 45 and to the wideband multiplexer 52. In addition to being coupled to the second narrowband mux/demux 40, the wideband multiplexer 52 is also connected to the wideband demultiplexer 51 to form the new WDM signal.

Figure 3A:
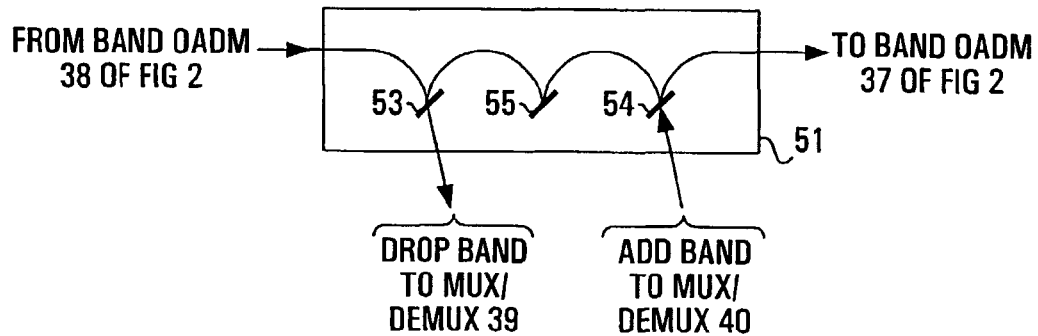
FIG. 3A is the band optical ADM (OADM) of the bidirectional WDM ring network of FIG. 2.

Preferably, the band isolating and combining functions are each performed by a wideband optical filter. FIG. 3A provides an example of a possible implementation of the band OADM 36 of FIG. 2 in which wideband optical filters are used. More specifically, the band OADM 36 illustrated therein has a wideband optical filter 53 externally coupled to node 35 (FIG. 2) to receive the WDM signal and also to the first narrowband mux/demux 39 (FIG. 2). Internally, this wideband optical filter 53 is connected to an optional clean-up filter 55 which is, in turn, coupled to another wideband optical filter 54. The clean-up filter 55 may be used to remove any vestiges of the band dropped from the WDM signal by the wideband optical filter 54. This prevents interference with the added channels, which could otherwise arise since the added channels may use the same carrier frequencies as were used by the dropped channels.

For further information relating to the architecture of the band OADM described above, reference may be made to copending U.S. patent application Ser. No. 09/208,465, entitled "Multichannel Optical Add/Drop Multiplexor/Demultiplexor", filed Dec. 10, 1998, in the name of D. Danagher. The disclosure of this application is hereby incorporated herein by reference.

Referring now back to FIG. 2, the operation of the wideband demultiplexer 51 together with the narrowband mux/demux 39 to isolate the first band and separate the first band isolated into its constituent channels ch1, ch2, ch3, ch4 is identical to the operation of the wideband multiplexer 52 and the narrowband mux/demux 40 for combining the channels ch1', ch2', ch3', ch4' to form the second band and combining the second band to the WDM signal spectrum and will now be described below with reference to the wideband demultiplexer 51 and its associated narrowband mux/demux 39.

In operation, the wideband demultiplexer 51 receives the WDM signal and functions to isolate the desired first band from the WDM signal spectrum which contains the K interleaved channels. At the narrowband mux/demux 39, the first band is separated into its constituent receive channels ch1, ch3 and transmit channels ch2, ch4, which are then respectively coupled to the optical transmitter unit 46 and the optical receiver unit 45 for bidirectional communication over with other nodes 34, 35 of the bidirectional WDM ring network over the first optical band of the WDM signal spectrum via the transmit and receive channel signals ch1, ch2, ch3, ch4.

The through band of the WDM signal spectrum is passed through the wideband demultiplexer 51 to the wideband multiplexer 52 where it is combined with the second band. As a result, the N–K channels are passed through the wideband demultiplexer 51 to the wideband multiplexer 52 to be combined therein with the new set of interleaved channels ch1', ch2', ch3' and ch4' to form the new WDM signal for bidirectionally communicating with other nodes 2, 3 along the fiber 32.

Figure 3B:
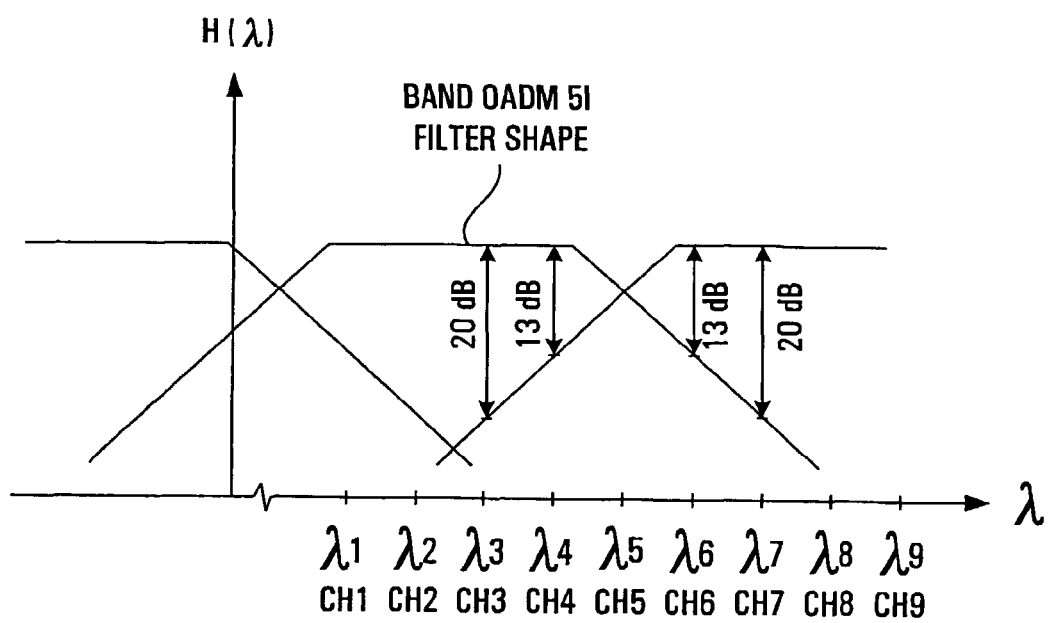
FIG. 3B is a wavelength plot of the wideband demultiplexer transfer function of the band OADM of FIG. 3A.

In order to isolate ch1, ch2, ch3 and ch4 with adequate channel isolation, node 33 performs two filtering steps. The first is accomplished by the wideband demultiplexer 51 by isolating from the WDM signal spectrum a band large enough to contain ch1, ch2, ch3 and ch4. As noted above, to isolate a portion of the WDM signal spectrum containing multiple channels, the wideband demultiplexer 51 may, for example, consist of a wideband optical filter such as that illustrated in FIG. 3A with a passband corresponding to the desired band to be isolated. FIG. 3B further describes the selection of the first band. Illustrated therein is an example of a transfer function which can be used by the wideband demultiplexer 51 for isolating the first band from the WDM signal spectrum which in FIG. 3B is shown as a normalized WDM signal having an optical spectrum extending from $\lambda 1$ to $\lambda 9$. For clarity, each of the four channels referred to in FIG. 2 namely ch1, ch2, ch3 and ch4 has been assigned to a particular wavelength labelled $\lambda 1$, $\lambda 2$, $\lambda 3$, $\lambda 4$. From this plot, it can be observed that a single channel guard band ($\lambda 5$) is set aside to reduce channel mixing between adjacent bands (further details below). It can also be observed that the shape of the band OADM 51 filter is such that the isolation provided to the first band from the through band linearly increases moving away from the first band. For example, the isolation provided to the first band from the through channels closest to the outside channels of the first band is shown to be 13 dB while the isolation from the second closest through channels increases to 20 dB.

Figure 4A:
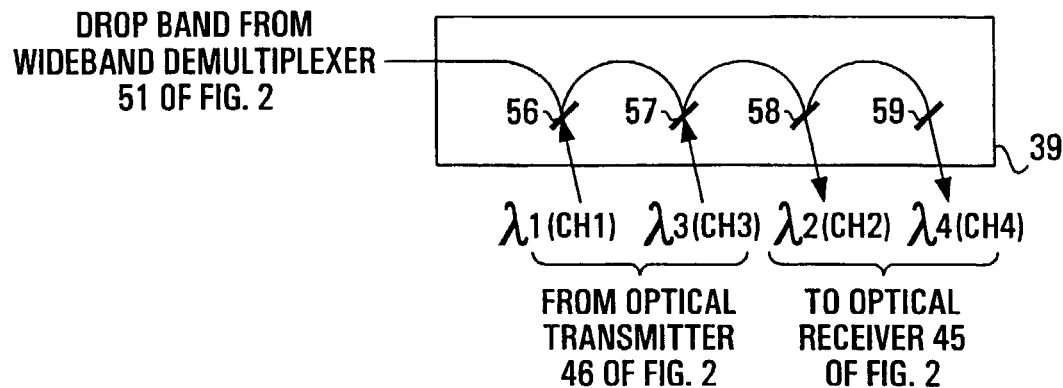
FIG. 4A is a diagram of the narrowband multiplexer/demultiplexer (mux/demux) of the bidirectional WDM ring network of FIG. 2.

Referring now back to FIG. 2, the second filtering step occurs where the first band isolated by the wideband demultiplexer 51 is separated by the narrowband mux/demux 39 into its constituent K interleaved channels. In order to achieve this, the narrowband mux/demux 39 may comprise a chain of optical filters with each filter associated to a specific wavelength so as to separate a particular transmit or receive channel from the first band. FIG. 4A illustrates an example of such a scheme. The narrowband mux/demux 39 depicted therein is comprised of four narrowband optical filters 56, 57, 58, 59 with filter 56 coupled to receive the first band from the wideband demultiplexer 51 of FIG. 2. The filters 56, 57, 58, 59 are arranged in concatenation and respectively connected to ch1, ch3, ch2, ch4. The receive channels, ch1 and ch3, are generated by the optical transmitter unit 46 of FIG. 2 while the transmit channels, ch2 and ch4, are directed to the optical receiver unit 45 also of FIG. 2.

In operation, the receive channels, ch1 and ch3, generated by the optical transmitter unit 46 are respectively coupled into the first band by filters 56, 57 while the transmit channels, ch2 and ch4, are respectively extracted from the first band by operation of filters 58, 5.9 and directed to the optical receiver unit 45 for further processing and rerouting.

Figure 4B:
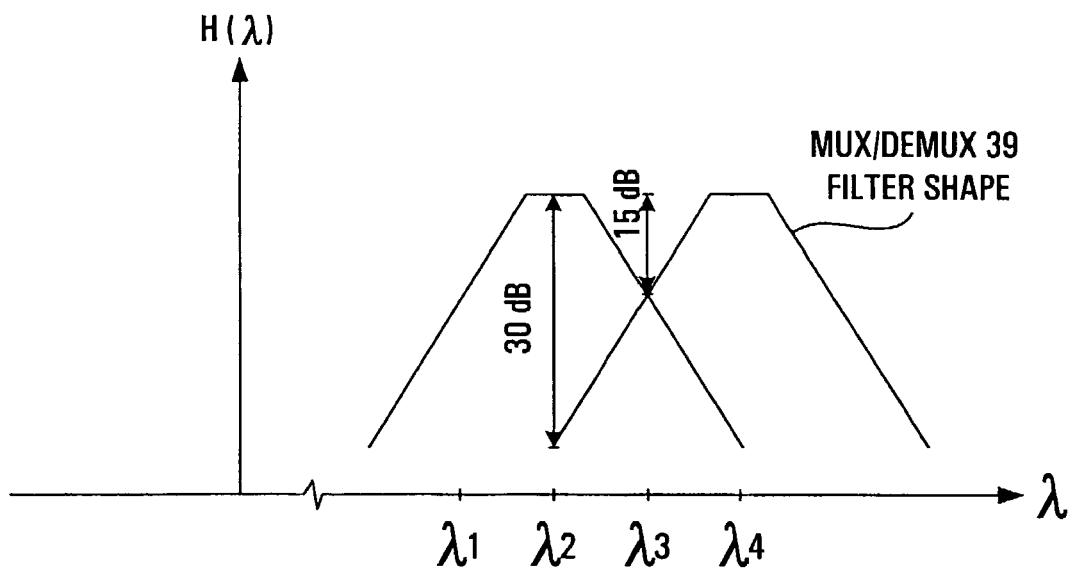
FIG. 4B is a wavelength plot of the transfer function of the narrowband mux/demux of FIG. 4A.

To further describe the operation of the narrowband mux/demux 39 as a whole, FIG. 4B shows an example of a transfer function which can be implemented by the narrowband mux/demux 39 for separating the first band signal spectrum into its constituent 4 channels. For clarity, FIG. 4B shows the first band signal spectrum normalized and the wavelength-channel assignment used identical to that used in FIG. 3B (i.e., λ1, λ2, λ3 and λ4 being respectively assigned to ch1, ch2, ch3 and ch4). As noted before, ch1 and ch3 are propagating in one direction, and ch2 and ch4 propagating in the opposite direction. From this plot, it can be observed that according to the present invention, the isolation provided between co-propagating channels within a band is higher than the isolation provided between adjacent counter-propagating channels within that band. For example, the isolation between co-propagating channels ch2 and ch4 is shown to be 30 dB while the isolation between adjacent transmit and receive channels, ch2 and ch3 is 15 dB.

This double filtering also helps reducing the possibility of channel mixing as between adjacent bands of the WDM signal spectrum. As a result, the width of the guard band necessary can also be reduced. In this particular example, the use of the wideband demultiplexer 51 together with the narrowband mux/demux 39 designed with the above-described filtering isolation requirements only requires a single channel guard band.

The presence of the wideband demultiplexer 51 to isolate the first band from the WDM signal spectrum before its constituent transmit and receive channels are actually separated and the wavelength interleaving of the transmit and receive channels within that first band makes it possible to lower the filter isolation requirements of the narrowband mux/demux 39.

In particular, because adjacent channels within a band are counter-propagating, the effective channel spacing between co-propagating transmit or receive channels within that band is twice that featured by an arrangement where adjacent channels are co-propagating. Thus, for a given narrowband mux/demux 39 filter shape, co-propagating channels are spaced further apart from one another (twice the separation) which results in isolation between co-propagating channels higher than necessary. According to the present invention, the effective channel spacing between adjacent channels within a band can therefore be reduced while maintaining the crosstalk figure between adjacent channels to an acceptable level (further details below). As the effective channel spacing between adjacent channels is reduced, a corresponding reduction in the figure of merit (FOM) of the narrowband mux/demux is achieved which results in lower filtering costs.

As noted above, the wider separation provided between counter-propagating channels permits a reduction in the effective spacing between adjacent channels with very little effect on the associated crosstalk figure. This is because adjacent channels are counter-propagating and therefore require less isolation from one another as the directionality of the narrowband optical filters 56, 57, 58, 59 used in the narrowband mux/demux 39 of FIG. 2 is selected to be high enough to maintain the crosstalk between adjacent channels to an acceptable level. Reflections must also be filtered out by the narrowband optical filters 56, 57, 58, 59 but as the optical return loss is typically greater than 20 dB for currently available narrowband optical filters such as those used in the narrowband mux/demux 39 of FIG. 2, the crosstalk component caused by reflections initially attenuated by the optical return loss is effectively reduced by the narrowband optical filters 56, 57, 57, 59 to a acceptable level.

To further illustrate this, there is provided below an example of a crosstalk calculation for adjacent channels counter-propagating within a band. This will be followed a another crosstalk calculation example for channels counter-propagating in adjacent bands.

In a bidirectional WDM ring network designed in accordance with the present invention. The power of a transmit channel such as ch2 or ch4 measured at the input of the mux/demux 39 can be as much as 30 dB below that of an adjacent transmit channel. However, the channel isolation between adjacent transmit and receive channels together with losses (transmission and reflection) incurred by the channels as they propagate through the filters 56, 57, 58, 59 (FIG. 4A) result in an acceptable crosstalk figure. For the bidirectional WDM ring network of FIG. 2, the crosstalk power between a transmit channel and an adjacent receive channel measured at the input of the narrowband mux/demux 39 can be calculated as follows:

Crosstalk power=$(Ptx-Prx)-2*F\_loss-R\_loss-Ch\_I$ where
Ptx=Power of a transmit channel;
Prx=Power of a receive channel;
F_loss=Filter transmission loss;
R_loss=Optical return loss; and
Ch_I=Channel isolation.

Assuming for the particular mux/demux filter arrangement shown in FIG. 4A a 30 dB power delta between adjacent transmit and receive channels with the filters 56, 57, 58, 59 selected to provide 15 dB of channel isolation and exhibit a 4 dB transmission loss and a 24 dB reflection loss, the crosstalk power of adjacent transmit and receive channels contained within a band such as, for example, ch2 and ch4 or ch1 and ch3 is carried out as follows:

Crosstalk power=(30 dB)-2*4 dB-24 dB-15 dB

According to the above calculation, the crosstalk figure for adjacent transmit and receive channels within a band is −17 dBc.

The crosstalk power between a transmit channel of a band and a receive channel of an adjacent band such as, for example, ch4 and ch6 (see FIG. 3B) can also be calculated:

Crosstalk power=(Ptx−Prx)−Tr_loss (mux+span+demux)−I(band+channel)

where
Ptx=Power of a transmit channel within a band;
Prx=Power of a receive channel within an adjacent band;
Tr_loss (mux)=Mux filter transmission loss;
Tr_loss (span)=band OADM filter transmission loss;
Tr_loss (demux) Demux filter transmission loss;
I (band)=Band isolation; and
I (channel)=Channel isolation.

Assuming for the particular band OADM 36 and mux/demux filter arrangement shown in FIG. 2 a 30 dB power delta between ch4 and ch6, a 4 dB span loss and the band OADM filter 54 (see FIG. 3A) designed to provide 13 dB of band isolation and exhibit a 4 dB band filter and channel filter transmission loss, the crosstalk power of adjacent transmit and receive channels respectively contained within adjacent bands is calculated as follows:

Crosstalk power=(30 dB)−(4 dB+4 dB+4 dB)−(13 dB+30 dB)

According to the above calculation, the crosstalk figure for ch4 and ch6 is −25 dBc.

While the invention has been described above with reference to a particular network topology, further modifications and improvements to support other network configurations which will occur to those skilled in the art, may be made within the purview of the appended claims, without departing from the scope of the invention in its broader aspect.

In particular, the invention has been described above with respect to a bidirectional WDM ring network. It is understood that the invention could also be applied to other topologies such as linear networks. Further, the invention is not restricted to single fiber network schemes and could also be used in WDM systems with multiple fiber links including networks with dedicated and shared protection as well as unprotected circuits.

The WDM signal described above in accordance with the invention has been defined as having N interleaved optical channels where the even numbered channels propagating in one direction, and the odd numbered channels propagating in the opposite direction. It is to be understood that the N channels of the WDM signal could alternatively be wavelength interleaved with the odd numbered channels propagating in one direction, and the even numbered channels propagating in the opposite direction.

It is also to be understood that while the WDM signal has been described as having all of its N channels interleaved, other channel arrangements of the WDM signal may be used without departing from the scope of the invention in its broader aspect. In particular, the WDM signal used in accordance with this invention may have the channels K contained in the first band interleaved while the channels N–K contained in the remainder portion of the WDM signal spectrum all propagate in the same direction. Alternatively, the WDM signal used may have the channels K' contained in the second band interleaved while the channels N–K contained in the remainder portion of the WDM signal spectrum all propagate in the same direction.

The first and the second band of the WDM signal have been described above as each having interleaved channels where the number of channels propagating in a particular direction is equal to the number of channels propagating in the opposite direction. It is to be understood that other channel arrangements may be used in each of the first and second band where the number of channels propagating in each direction is different. Further, it is also to be understood that the channels propagating in opposite directions within the first and/or the second band may be arranged not to be interleaved.

The bidirectional WDM ring network described above in accordance with the invention operates with a four channel first band and a four channel second band at each node. It is understood that the number of channels in each of the first and second band used at each node can be decreased to a minimum of two channels (one transmit channel and one receive channel) per band or alternatively increased in accordance with the principles enunciated therein to suit the more demanding channel capacity requirements of emerging network applications.

At any one node of the bidirectional WDM ring network, the first band may be selected to have the same spectral width than that of the second band. In this situation, it is also understood that the second band may be located within the spectral range vacated by the first band as a result of the first band being isolated from the WDM signal spectrum. Alternatively, the second band may be located in a different spectral range, as for example one which would have been vacated as a result of a band being isolated earlier in the WDM signal transmission path by another node of the bidirectional WDM ring network.

Further, if the second band of a node is to be located within the spectral range vacated by the first band isolated at the same node, the new set of interleaved channels K' contained in the second band may use the same wavelengths as those previously used by the K channels isolated. Alternatively, the channels K' of the second band may use different wavelengths (albeit within the same spectral range) provided these wavelengths are suited for WDM communications.

The nodes of the bidirectional WDM ring network have been described with an first and second band. It is understood that the nodes may alternatively be designed in accordance with the present invention with only a first band or in the further alternative, with only a second band. Still in the further alternative, the nodes may be designed to isolate or combine multiple bands. Accordingly, it is understood that the number of band OADMs and narrowband mux/demux used at each node would have to be adjusted for servicing the additional bands isolated or combined from or to the WDM signal spectrum.

What is claimed is:

1. A band optical add-drop multiplexer (OADM) for a bidirectional wavelength division multiplexed (WDM) network for processing a bidirectional WDM signal of a defined spectrum formed of multiple optical channels for carrying, via a single optical fiber, channel signals in a first direction and channel signals in a second direction, the band OADM being operative for isolating a first optical band from the WDM signal spectrum and passing through a remainder portion thereof, wherein the first optical band contains a first set of optical channels comprising a first plurality of optical channels for carrying respective channel signals propagating in the first direction and a second plurality of optical channels for carrying respective channel signals propagating in the second direction, the band OADM also being operative for combining a second optical band with the remainder portion of the WDM signal spectrum to form another bidirectional WDM signal formed of multiple channels for carrying, via a single optical fiber, channel signals in a first direction and channel signals in a second direction, wherein the second optical band contains a second set of optical channels comprising a first plurality of optical channels for carrying respective channel signals propagating in the first direction and a second plurality of optical channels for carrying respective channel signals propagating in the second direction.

2. The band OADM of claim 1 in combination with:
a first multichannel coupling unit connected to the band OADM to separate the first optical band into the first set of optical channels;
an optical transmitter unit connected to the first multichannel coupling unit for generating the channel signals propagating in the first direction in the first plurality of optical channels; and
an optical receiver unit connected to the first multichannel coupling unit for collecting the channel signals propagating in the second direction in the second plurality of optical channels.

3. The band OADM of claim 1 wherein for isolating the first optical band and passing through the remainder portion of the WDM signal spectrum, the band OADM comprises a wideband demultiplexer.

4. The band OADM of claim 2 in combination with a second multichannel coupling unit connected thereto for combining the respective ones of the second set of optical channels.

5. The band OADM of claim 4 wherein the optical transmitter unit is also connected to the second multichannel coupling unit for generating the channel signal propagating in the first direction in the at least one optical channel.

6. The band OADM of claim 4 wherein the optical receiver unit is also connected to the second multichannel coupling unit for collecting the channel signal propagating in the second direction in the at least one other optical channel.

7. The band OADM of claim 5 wherein the optical transmitter unit is comprised of a plurality of optical transmitters, each for generating a respective one of the channel signals propagating in the first direction.

8. The band OADM of claim 4 wherein the second multichannel coupling unit comprises a plurality of narrowband optical filters for combining the respective ones of the second set of optical channels to form the second optical band.

9. The band OADM of claim 6 wherein the optical receiver unit is comprised of a plurality of optical receivers, each for receiving a respective one of the channel signals propagating in the second direction.

10. The band OADM of claim 2, wherein a wideband demultiplexer isolates the first optical band from the WDM signal spectrum and passes through the remainder portion thereof and a wideband multiplexer combines the second optical band with the remainder portion of the WDM signal spectrum, further comprising a clean-up filter between the wideband demultiplexer and the wideband multiplexer for preventing interference between the first optical band and the second optical band.

11. The band OADM of claim 10 wherein the wideband demultiplexer and the wideband multiplexer are wideband optical filters.

12. The band OADM of claim 2 wherein the first multichannel coupling unit comprises a plurality of narrowband optical filters for separating the first optical band into the first set of optical channels.

13. The band OADM of claim 2 wherein each of the first and second optical bands contains a respective even number of optical channels.

14. The band OADM of claim 2 wherein the first plurality of optical channels is interleaved with the second plurality of optical channels.

15. The band OADM of claim 2 wherein the remainder portion of the WDM signal spectrum is formed of a first plurality of optical channels for carrying respective channel signals propagating in the first direction and a second plurality of optical channels for carrying respective channel signals propagating in the second direction, wherein the first plurality of optical channels is interleaved with the second plurality of optical channels.

16. The band OADM of claim 2 wherein the WDM signal spectrum is formed of a first plurality of optical channels for carrying respective channel signals propagating in the first direction and a second plurality of optical channels for carrying respective channel signals propagating in the second direction, wherein the first plurality of optical channels is interleaved with the second plurality of optical channels.

17. The band OADM of claim 2 wherein the first optical band and the second optical band occupy the same spectral range.

18. The band OADM of claim 2 wherein the first optical band and the second optical band occupy different spectral ranges.

19. The band OADM of claim 2 wherein a single channel guard band is disposed between the first optical band and the second optical band.

20. The band OADM of claim 2 wherein the combined operation of the band OADM and a respective one of the first and second multichannel coupling units provides the channel isolation necessary for WDM operations.

21. A band optical add-drop multiplexer (OADM) for a bidirectional wavelength division multiplexed (WDM) network for processing a bidirectional WDM signal of a defined spectrum formed of multiple optical channels for carrying, via a single optical fiber, channel signals in a first direction and channel signals in a second direction, the band OADM being operative for isolating a first optical band from the WDM signal spectrum, isolating a second optical band from the WDM signal spectrum, and passing through a remainder portion of the WDM signal spectrum, wherein each of the first and second optical band contains a respective first set of optical channels comprising a first plurality of optical channels for carrying respective channel signals propagating in the first direction and a second plurality of optical channels for carrying respective channel signals propagating in the second direction, the band OADM also being operative for combining a third optical band with the remainder portion of the WDM signal spectrum to form another bidirectional WDM signal formed of multiple channels for carrying, via a single optical fiber, channel signals in a first direction and channel signals in a second direction, wherein the third optical band contains a second set of optical channels comprising a first plurality of optical channels for carrying respective channel signals propagating in the first direction and a second plurality of optical channels for carrying respective channel signals propagating in the second direction.

22. The band OADM of claim 21 wherein the WDM signal spectrum is formed of a first plurality of optical channels for carrying respective channel signals propagating in the first direction and a second plurality of optical channels for carrying respective channel signals propagating in the second direction, wherein the first plurality of optical channels is interleaved with the second plurality of optical channels.

23. A WDM apparatus for a node in a bidirectional WDM network for processing a bidirectional WDM signal of a defined spectrum formed of multiple optical channels for carrying channel signals in a first direction and channel signals in a second direction, the WDM apparatus comprising:
- a band OADM for isolating a first optical band from the WDM signal spectrum and passing through a remainder portion of the WDM signal spectrum, wherein the first optical band contains a first set of optical channels comprising at least one optical channel for carrying a channel signal propagating in the first direction and at least one other optical channel for carrying a channel signal propagating in the second direction;
- a first multichannel coupling unit connected to the band OADM to separate the first optical band into the first set of optical channels;
- an optical transmitter unit connected to the first multichannel coupling unit for generating the channel signal propagating in the first direction in the at least one optical channel; and
- an optical receiver unit connected to the first multichannel coupling unit for collecting the channel signal propagating in the second direction in the at least one other optical channel.

24. A method for a node in a bidirectional WDM optical fiber communication network to process a bidirectional WDM signal of a defined spectrum formed of multiple optical channels for carrying, via a single optical fiber, channel signals in a first direction and channel signals in a second direction, the method comprising the steps of:
- isolating a first optical band from the WDM signal spectrum and passing through a remainder portion of the WDM signal spectrum, wherein the first optical band contains a first set of optical channels comprising a first plurality of optical channels for carrying respective channel signals propagating in the first direction and a second plurality of optical channels for carrying respective channel signals propagating in the second direction;
- separating the first optical band into the first set of optical channels;
- generating the channel signals propagating in the first direction in the first plurality of optical channels; and
- collecting the channel signals propagating in the second direction in the second plurality of optical channels;
- combining a second set of optical channels comprising a first plurality of optical channels for carrying respective channel signals propagating in the first direction and a second plurality of optical channels for carrying respective channel signals propagating in the second direction to form a second optical band;
- combining the second optical band with the remainder portion of the WDM signal spectrum to form another bidirectional WDM signal;
- generating the channel signals propagating in the first ection in the first plurality of optical channels; and
- collecting the channel signals propagating in the second ection in the second plurality of optical channels.

* * * * *